United States Patent [19]

Kobayashi

[11] Patent Number: 4,730,662

[45] Date of Patent: Mar. 15, 1988

[54] AUTOMOTIVE AUTOMATIC AIR CONDITIONING SYSTEM WITH VARIABLE TEMPERATURE DEMIST MODE

[75] Inventor: Shinma Kobayashi, Hiratsuka, Japan

[73] Assignee: Nissan Shatai Company, Kanagawa, Japan

[21] Appl. No.: 603,904

[22] Filed: Apr. 25, 1984

[30] Foreign Application Priority Data

Sep. 14, 1983 [JP] Japan .................. 58-169731
Sep. 30, 1983 [JP] Japan .................. 58-183678

[51] Int. Cl.[4] .............. B60H 3/00; F25B 29/00; B61D 27/00
[52] U.S. Cl. ........................... 165/25; 165/43; 165/17; 165/12; 62/180; 62/186; 98/2.01; 98/2.09
[58] Field of Search ................. 165/12, 25, 17, 42, 165/43, 16; 236/DIG. 9, 49; 62/180, 186; 98/2.09, 2.01, 2.08

[56] References Cited

U.S. PATENT DOCUMENTS

| 4,323,111 | 4/1982 | Iijima ..................... 62/180 |
| 4,368,843 | 1/1983 | Kai et al. .................. 236/49 |
| 4,408,713 | 10/1983 | Iijima et al. ............... 236/49 |
| 4,448,035 | 5/1984 | Moriyama et al. ........... 98/2.01 |
| 4,478,274 | 10/1984 | Naganoma et al. ............ 62/180 |
| 4,519,443 | 5/1985 | Sutoh et al. ............... 165/17 |
| 4,602,675 | 7/1986 | Kobayashi ................. 236/49 |

FOREIGN PATENT DOCUMENTS

| 2204508 | 8/1973 | Fed. Rep. of Germany ....... 236/49 |
| 0018142 | 2/1978 | Japan .................... 98/2.09 |
| 0123516 | 9/1980 | Japan .................... 62/180 |
| 0026010 | 2/1982 | Japan .................... 62/243 |
| 0077210 | 5/1982 | Japan .................... 98/2.09 |
| 0070720 | 5/1982 | Japan .................... 62/243 |
| 0070721 | 5/1982 | Japan .................... 62/243 |
| 0182509 | 11/1982 | Japan .................... 98/2.08 |
| 0008419 | 1/1983 | Japan .................... 62/243 |
| 0136509 | 8/1983 | Japan .................... 62/243 |

Primary Examiner—William R. Cline
Assistant Examiner—John K. Ford
Attorney, Agent, or Firm—Schwartz, Jeffery, Schwaab, Mack, Blumenthal & Evans

[57] ABSTRACT

An automotive air conditioning system has a DEMIST mode which is operative at least in VENT or BI-LEVEL modes for switching conditioned air flow from an upper vent air outlet to a defroster nozzle. In the DEMIST mode, the temperature of air discharged through the defroster nozzle is controlled according to a previously selected, desired temperature so that the air discharged through the defroster nozzle can perform defrosting or demisting of the front windshield as well as conditioning of the temperature in the vehicle cabin. A blower speed control system responds to selection of the DEMIST mode by temporarily adjusting the variation range of the blower speed to not less than a medium speed for a given time period. This helps speed the defrosting or demisting effect of the air conditioning system.

11 Claims, 12 Drawing Figures

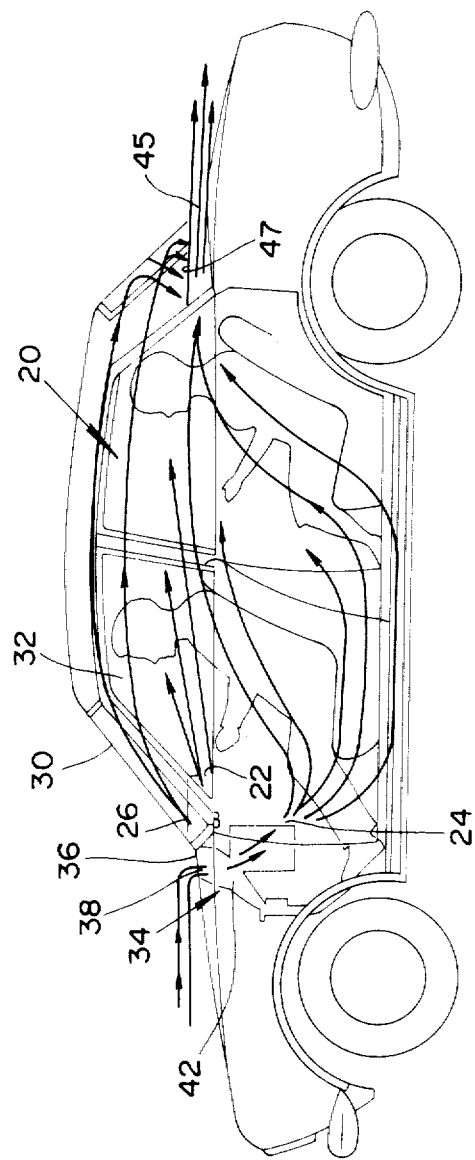

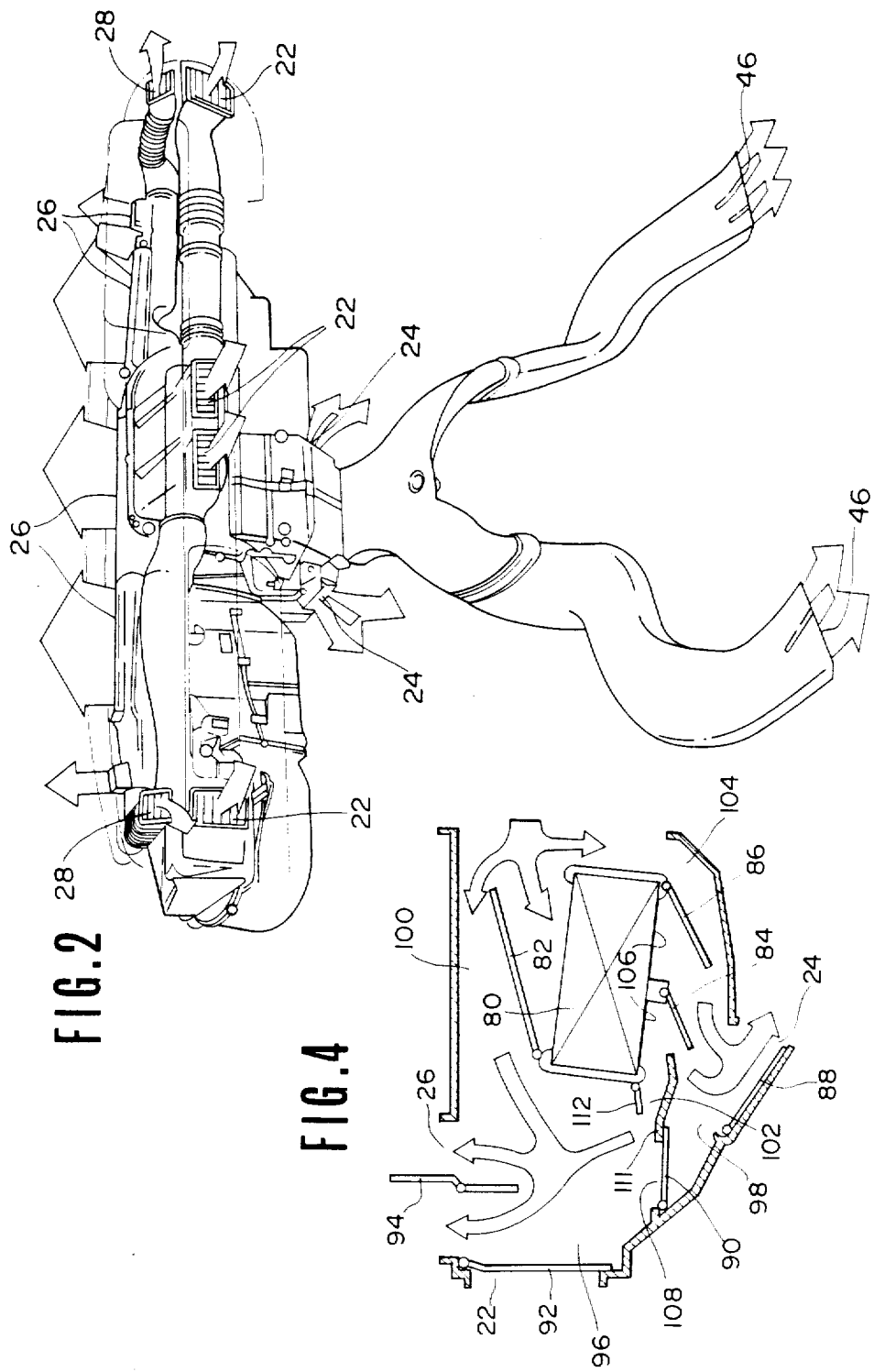

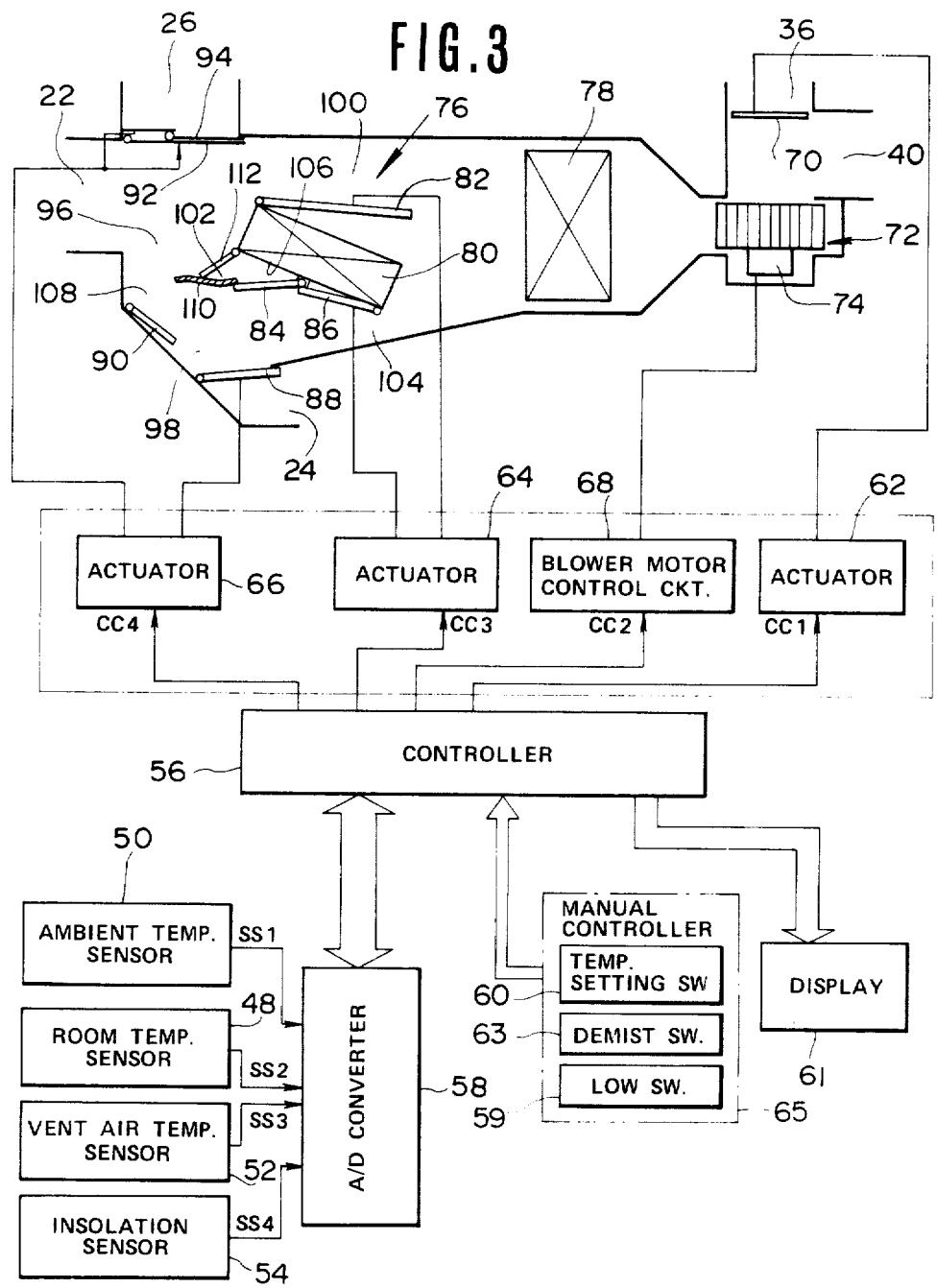

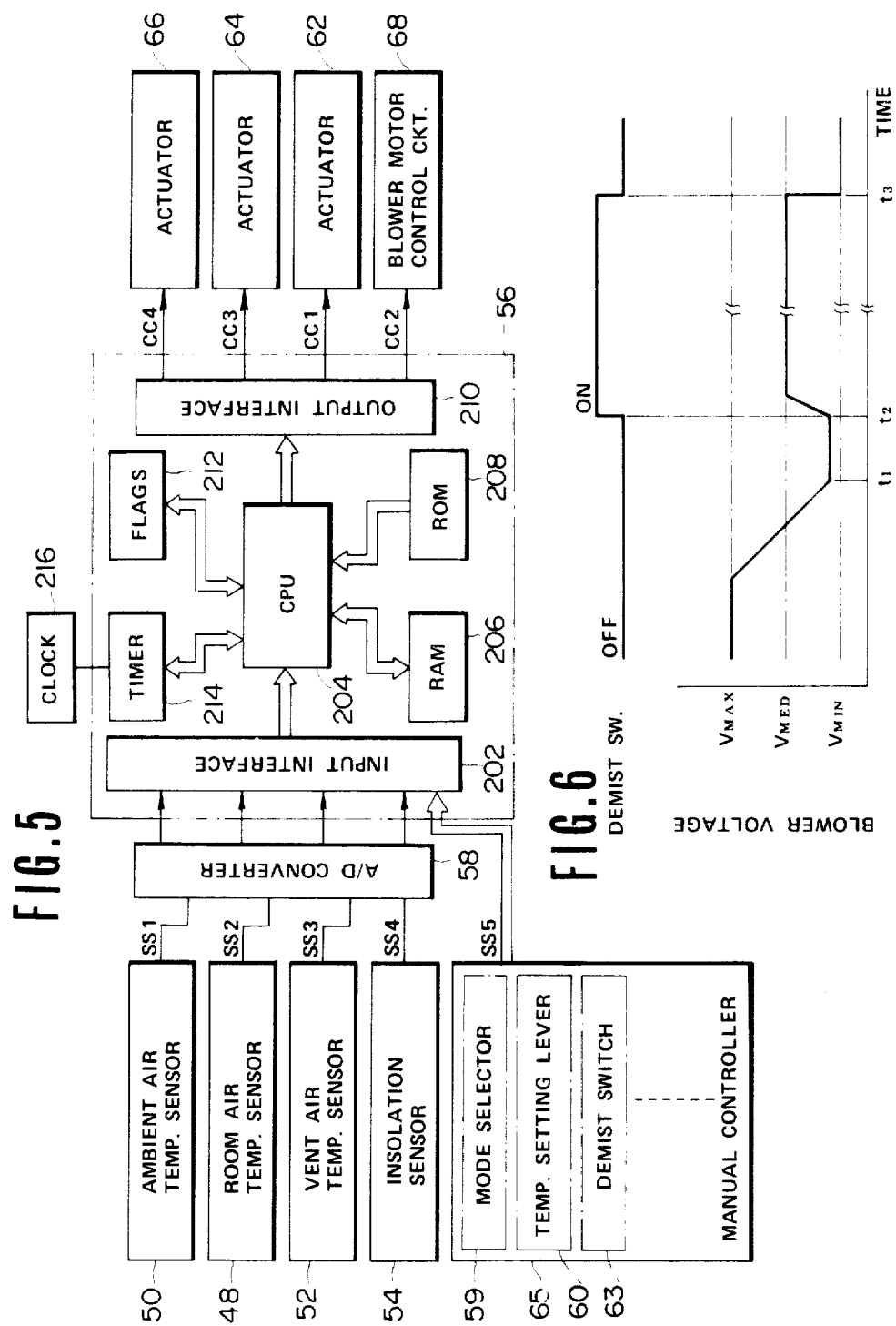

AUTOMOTIVE AUTOMATIC AIR CONDITIONING SYSTEM WITH VARIABLE TEMPERATURE DEMIST MODE

BACKGROUND OF THE INVENTION

The present invention relates generally to an automatic air conditioning system for an automotive vehicle, which can operate in various operational modes including a defrosting or demisting mode in which the temperature of air discharged through a defroster nozzle or nozzles is controlled in accordance with a set temperature. More particularly, the invention relates to a blower control system for an automatic air conditioning system which can operate in a demisting mode.

Throughout the disclosure, the term "DEMIST mode" will be used to refer to the case in which air is discharged only through the defroster nozzle and the floor or lower air outlet. The temperature of the air to be discharged through the defroster nozzle and the lower air outlet is adjusted according to a set temperature.

In general, an automotive automatic air conditioning system is operable either in MANUAL mode or AUTO mode. A DEFROST mode can be selected manually to discharge warm or hot air through a defroster nozzle toward a front windshield in order to defrost or defog same. When the DEFROSTER mode is selected, a temperature-controlling air mix door is actuated to its full-heating position to adjust the temperature of the air to be discharged through the defroster nozzle to the highest possible temperature. In addition, when the DEFROSTER mode is selected, a chest vent and a floor vent are shut so that the defrosting or defogging air is discharged only through the defroster nozzle. As a result, the feet of the occupant of the vehicle cabin may become cold.

Additionally, if the air conditioning system is operated in the DEFROSTER mode, a compressor actuation clutch is disconnected so that the engine output will not be transmitted to the compressor. Therefore, humidity in the vehicle cabin will not be controlled. This, in turn, means when the air conditioner operates in the DEFROSTER mode, the front windshield may at first frost or fog over, degrading visibility.

SUMMARY OF THE INVENTION

Such defects encountered in conventional automatic air conditioning systems may be resolved by discharging temperature-controlled air through the defroster nozzle while operating the compressor for dehumidification.

It is an object of the present invention to provide an automotive air conditioning system which has a demist or defogging mode in which air is delivered through a defroster nozzle and a floor vent or lower air outlet in order to simultaneously perform defrosting or defogging and cabin air conditioning.

Another and more specific object of the present invention is to provide a blower speed control system for an automotive air conditioning system which adjusts the variation range of the blower speed when the demist mode is selected.

In order to accomplish the above-mentioned and other objects, an air conditioning system, in accordance with the present invention, has an upper air outlet or ventilator outlet, a lower air outlet or a floor ventilator outlet and a defroster nozzle. A demist mode selector switch is capable of designating the lower air outlet and defroster nozzle for delivery of conditioned air. The demist mode selector switch can be depressed while the air conditioning system is operated in VENT, BI-LEVEL and other modes. Blower speed is controlled in the DEMIST mode to vary with the range from medium speed to maximum speed. By limiting the variation range of the blower speed to the medium speed or above, defrosting or defogging effect in the DEMIST mode is assured of being speedy.

If desired, the adjustment of the variation range of the blower speed can be made temporarily for a given period of time after starting air conditioning system operation in the DEMIST mode.

BRIEF DESCRIPTION OF THE DRAWINGS

The present invention will be understood more fully from the detailed description given herebelow and from the accompanying drawings of the preferred embodiments of the present invention, which, however, should not be taken to limit the invention to the specific embodiments but are for explanation and understanding only.

In the drawings:

FIG. 1 is a diagram of major air flow regimes through an automotive vehicle in which the preferred embodiment of a dual flow type air conditioning system according to the present invention is installed;

FIG. 2 is an illustration of the air conditioning system of FIG. 1 as seen from inside the vehicle and diagramming the positions of a center vent, a floor vent, a defroster nozzle and so forth;

FIG. 3 is a diagram of the preferred embodiment of the air conditioning system according to the present invention;

FIG. 4 is a section of the air conditioner unit shown in at a DEMIST mode;

FIG. 5 is a block diagram of the first embodiment an air conditioner control system according to the present invention;

FIG. 6 shows typical variation of the blower voltage in response to changes in the demist switch position;

DESCRIPTION OF THE PREFERRED EMBODIMENTS

Figure 9:
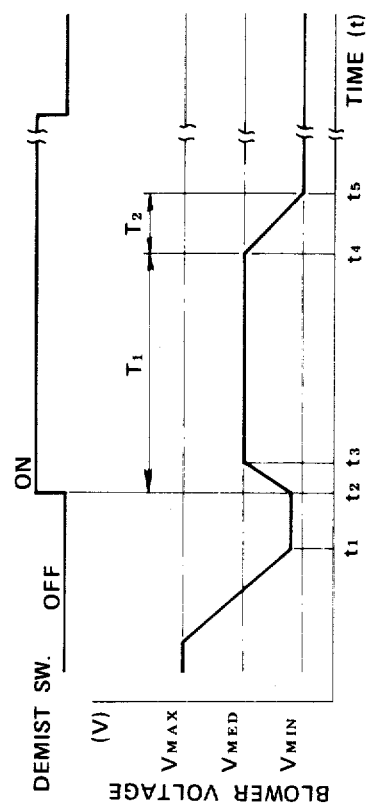
FIG. 9 shows variation of the blower voltage controlled by the blower speed control program of FIG. 8.

It should be noted that this application is one of five related Patent Applications in the United States of America filed on the same date. The related applications are listed below:

| U.S. Application Serial No. | Title of the Invention |
| --- | --- |
| 603,903 (now U.S. Pat. No. 4,681,153) | Automotive Air Conditioning System With Independent |

-continued

| U.S. Application Serial No. | Title of the Invention |
|---|---|
| | Temperature Control For Dual Air Flows |
| 603,830 (Abandoned) | Method and Apparatus For Air Conditioner Control |
| 603,829 now U.S. Pat. No. 4,562,954 | Method and Apparatus For Air Conditioner Control |
| 603,828 now U.S. Pat. No. 4,523,715 | Method and Apparatus For Air Conditioner Control |
| 603,841 F.W.C. filed August 4, 1986 Serial No. 891,430 | Automatic Air Conditioning System for An Automotive Vehicle |

The contents of the above listed five co-pending related applications are hereby incorporated by reference.

In addition, the following co-pending U.S. Patent Applications disclose inventions related to the present invention and assigned to the common Assignee.

| U.S. Ser. No. | Filing Date |
|---|---|
| 527,784 (now U.S. Pat. No. 4,617,986) | August 30, 1983 |
| 527,785 (now U.S. Pat. No. 4,602,675) | August 30, 1983 |
| 526,634 | August 26, 1983 |
| 526,428 now U.S. Pat. No. 4,538,760 | August 25, 1983 |

The disclosure of the above-listed co-pending U.S. Patent Applications are also hereby incorporated by reference.

Referring now to the drawings, particularly to FIGS. 1 and 2, the major air flow regimes of a dual-flow automotive air conditioning system have been illustrated. In general, the automotive air conditioning system controls the temperature and humidity of air within the passenger compartment 20. The air conditioning system can operate in a VENT mode for ventilating the compartment air, a HEATHER mode for increasing the compartment temperature, a BI-LEVEL mode for delivering relatively cool air through an upper air outlet 22 and relatively warm air through a lower air outlet 24 or a DEFROSTER mode for delivering hot air through defroster nozzles 26 and 28. The air conditioning system can also operate in AUTO mode to automatically control the positions of the upper air outlet 22, the lower air outlet 24 and the defroster nozzle 26 and 28 as well as controlling the air temperatures at the upper and lower vents.

The upper air outlet 22 serves as the aforementioned upper vent and the lower air oulet 24 serves as the aforementioned lower vent. The defroster nozzles 26 (hereafter referred to as "front defroster nozzel") are directed toward a front windshield 30 and discharge hot air in order to defrost and/or defog same. The defroster nozzles 28 (hereafter referred to as "side defroster nozzle") are directed toward side door windows 32 and discharge hot, defrosting air to clear the passengers' windows.

The air conditioning system also includes an air induction system which is generally referred to by the reference numeral 34. The air induction system 34 includes an ambient air intake 36 opening into a cowl top panel 38 and an internal air intake 40 (shown in FIG. 3) adapted to draw air in from the passenger compartment 20. The air induction system also includes a fresh/recirculate control door 70 selectively connecting an induction passage 42 to either or both of the ambient air intake 36 and the internal air intake 40. Thus, the air conditioning system can operate in FRESH mode in which the ambient air intake 36 alone is connected to the air inductionn passage 42, RECIRCULATION mode in which the internal air intake 40 alone is connected to the induction passage 42, or INTERMEDIATE mode in which the induction passage 42 is connected to both the ambient air intake 36 and the internal air intake 40. In the shown structure, there is also a rear lower air outlet 46 which delivers air from below the front seats.

In FRESH mode, an air outlet 45 is formed at an appropriate point in the vehicle body in order to vent air from the passenger compartment. The air outlet 45 communicates with a ventilation intake 47 within the passenger compartment.

In order to control the upper and lower vent air temperatures in AUTO mode, a temperature sensor 48, shown diagrammatically in FIG. 3, detects the air temperature within the passenger compartment and produces a signal indicative of the temperature in the passenger compartment, which sensor 48 will be hereafter referred to as "room temperature sensor" and the signal produced by the room temperature sensor will be hereafter referred to as "room temperature signal. Another temperature sensor 50 detects ambient air temperature outside of the passenger compartment and produces a signal indicative of the ambient temperature, which sensor 50 will be hereafter referred to as "ambient temperature sensor" and the signal produced by the ambient temperature sensor will be hereafter referred to as "ambient temperature signal". An additional temperature sensor 52 is provided in a passage communicating with the upper air outlet 22 through which upper vent air flows to detect the temperature of the upper vent air and produces a signal indicative of the upper vent air temperature, which sensor 52 will be hereafter referred to as "blower temperature sensor" and which signal produced by the blower temperature sensor will be hereafter referred to as "blower temperature signal". An insolation sensor is also provided to detect the amount of incident sunshine or insolation and produce a insolation signal.

FIG. 3 schematically illustrates the control system of the air conditioning system. The room temperature sensor 48, the ambient temperature sensor 50, the blower temperature sensor 52 and the insolation sensor 54 are connected to a controller 56 via an analog-to-digital (A/D) converter 58. A temperature setting switch 60 manually operable to set the desired room temperature is also connected to the controller 56 to supply a set temperature signal representative of the desired room temperature. The controller 56 is, in turn, connected to a display unit 61 to display the set temperature in digital form.

The controller is also connected to actuators 62, 64 and 66 and to a blower motor control circuit 68. The actuator 62 is associated with fresh/recirculate control door 70 provided at the junction of the ambient air intake 36 and the internal air intake 40 to selectively connect the induction passage 42 to one or both of the ambient air intake and the internal air intake. A blower 72 is provided in the induction passage downstream of the fresh/recirculate control door 70. The blower 72 includes a blower motor 74 associated with the blower motor control circuit. The induction passage 42 is connected to an air conditioner unit which is labelled with the reference numeral 76. The air conditioner unit 76 includes an evaporator 78 and a heater core 80, the latter being connected to an engine radiation system so that heated engine coolant can pass therethrough. As is well known, the heater core therefore serves as a kind of heat exchanger for heating air passing therethrough.

An air-mix door 82 is associated with the upstream face of the heater core 80 to control the flow of air through or around the heater core. The actuator 64 controls the position, or open degree, of air mix door 82. The actuator 64 also connected to lower vent air control door 84 and 86 which co-operate to control the temperature of the lower vent air. The actuator 64 controls the open degree of the lower vent air control doors 84 and 86.

A lower air outlet shutter 88 and a lower vent control door 90 cooperate through a linkage (not shown) to operate alternatingly. For instance, when the lower air outlet shutter 88 is opened, the lower vent control door 90 is closed and when the lower air outlet shutter is closed, the lower vent control door is opened. Both the shutter 88 and the door 90 are controlled by the actuator 66. The actuator 66 also controls an upper air outlet shutter 92 and a defroster mode door 94.

An upper vent air mix chamber 96 is defined near the upper air outlet 22 and a lower vent air mix chamber 98 is defined below and downstream of the heater core 80. The upper vent air mix chamber is connected to an unheated air passage 100 and a heated air passage 102. The lower vent air mix chamber 98 is exposed to the unheated air passage 104 and opposes the downstream face 106 of the heater core 80. The upper vent air mix chamber 96 and the lower vent air mix chamber 98 communicate through a communication passage 108 defined by a through opening formed in an upper-and-lower vent partition 110. The communication passage 108 is opened and closed by means of the lower vent control door 90. On the other hand, a pressure responsive door 112 is hung across the heated air passage 102. The pressure responsive door 112 is responsive to air flow from the upper vent air mix chamber 96 to the lower vent air mix chamber 98 to shut the passage 102. In turn, the pressure responsive door 112 is responsive to heated air flowing through the heated air passage from the heater core outlet 106 to the upper vent air mix chamber 96 to permit the heated air to pass therethrough.

It will be appreciated that when the air conditioning system is operated in the COOLER mode, the evaporator is in operation in accordance with the operation of a compression (not shown) associated with the engine, to cool the intake air.

The nature and use of vent air temperature control parameters has been disclosed in the co-pending U.S. patent application Ser. No. 527,784, filed on Aug. 30, 1983 and assigned to the assignee of the present invention. The disclosure of the co-pending U.S. patent application Ser. No. 527,784 is hereby incorporated by reference for the sake of disclosure. In addition, the U.S. patent application Ser. No. 527,785, filed on Aug. 30, 1983, and also assigned to the assignee of the present invention, discusses the operation of a control system controlling the blower speed by adjusting the voltage to be supplied to the blower motor. The disclosure of the co-pending U.S. patent application Ser. No. 527,785 is hereby incorporated by reference for the sake of disclosure.

The system described above can be operated in AUTO or MANUAL mode, the latter allowing selection among VENT, BI-LEVEL, HEATER, DEFROSTER, DEMIT and FLOOR modes. In addition, HIGH and LOW blower speed modes can be selected in AUTO mode. DEMIST mode can be selected during operation under either an AUTO mode or MANUAL-VENT, BI-LEVEL, HEATER modes and also can be selected under either HIGH or LOW blower speed modes.

In DEMIST mode, when selected under BI-LEVEL or HEAT mode, the center vent shutter 92 seals the center vent 22. On the other hand, the defroster mode door 94 and the floor vent shutter 88 are both opened to open the defroster nozzle 26 and the floor vent 24.

In this position, the air mix door 82 is partially opened so as to apportion the air passing through the cold air passage 100. As a result, part of the air flowing through the cold air passage 100 is directly introduced into the upper vent air mix chamber 96, and the rest of the air flowing through the cold air passage 100 flows through the heater core 80. The lower vent air control doors 84 and 86 are opened to open the heater air outlet 106, allowing the heated air flowing through the air outlet 106 to flow into the lower vent air mix chamber 98 and mix with the air introduced through the cold air passage 104. The heated air is also introduced into the upper vent air mix chamber 96 via the heated air passage 102. In this case, since the pressure in the lower air mix chamber 98 is higher than that in the upper vent air mix chamber 96, the pressure-responsive door 112 is held open to allow heated air to flow through the air passage 102 into the upper vent air mix chamber 96. By introducing the heated air through the heater air passage 102, the air temperature in the upper vent air mix chamber 96 can be adjusted to a desired temperature.

As set forth above, since the lower vent control door 90 is linked with the floor vent shutter 88, the lower vent control door 90 is closed to block air flow through the communication passage 108.

In the preferred arrangement, 80% of air flow will be discharged through the floor vent and 20% will be discharged through the defroster nozzle in the DEMIST mode.

It should be appreciated that the door arrangement described above is only one example of the patterns possible in the DEMIST mode and that, in DEMIST mode, the air mix door position and other door positions may vary depending upon the other operation mode selections coupled with the DEMIST mode and depending upon temperature conditions.

Referring to FIG. 5, the preferred embodiment of the air conditioner control system has been illustrated in greater detail than in FIG. 3. The controller 56 comprises a microcomputer including an input interface 202, CPU 204, RAM 206, ROM 208 and an output interface 210. The ambient air temperature sensor 50, room temperature sensor 48, the blower air temperature sensor 52 and insolation sensor 54 are connected to the input interface 502 via the A/D converter 68 for supplying respectively the ambient air temperature-indicative signal SS1, the room air temperature-indicative signal SS2, the blower air temperature indicative signal SS3 and insolation value indicative signal SS4.

The input interface 502 of the controller 56 is also connected to the manual controller 65 to receive all of the information pertaining to the driver-selectable air conditioning parameters, including desired temperature, operation mode, blower speed, defrost, etc. As described with reference to FIG. 3, the manual controller 65 includes a plurality of input devices, including among possible others a mode selector lever 59, a temperature setting lever 60 and a demist switch 63.

The output interface 210 of the controller 56 sends a control signal CC3 to air mix door actuator 64 to control the positions of the air mix doors 82, 84 and 86. The output interface 506 is also connected to the actuators 62 and 66 which control the fresh/recirculate control door 36 and the defroster mode door 94, center vent shutter 92, lower vent control door 90 and floor vent shutter 88 in response to control signals CC1 and CC4 respectively. The output interface 210 also sends a control signal CC2 to a blower motor control circuit 68. The blower control signal CC2 has a value indicative of a blower speed value derived on the basis of the predetermined or preselected blower control parameters as set out below with reference to FIGS. 6 and 7.

ROM 208 includes memory areas storing a blower air temperature control program, an operation mode selector program and a blower speed control program. The blower air temperature control program has been disclosed in the co-pending U.S. patent application Ser. No. 527,784 filed on Aug. 30, 1983, by Shinma KOBAYASHI, and is also disclosed in the co-pending U.S. patent application Ser. No. 603,830 entitled "Method and Apparatus for Air Conditioner Control" filed on the same day as the present invention and corresponding to Japanese Patent Application No. 58-168394, filed Sept. 14, 1983. The contents of the above-identified co-pending applications are hereby incorporated by reference for the sake of disclosure.

In addition, the blower speed control program has been disclosed in the co-pending U.S. patent application Ser. No. 526,634 filed on Aug. 26, 1983, by Shinma KOBAYASHI et al. U.S. Ser. No. 527,785, filed Aug. 30, 1983, by Shinma KOBAYASHI and is also disclosed in the co-pending U.S. patent application Ser. No. 603,829 entitled "Method and Apparatus for Air Conditioner Control" filed on the same day as the present invention and correspondng to Japanese Patent Application No. 58-169743, filed on Sept. 14, 1983. The disclosure concerning blower speed control in the foregoing co-pending applications are hereby incorporated by reference for the sake of disclosure.

Figure 7:
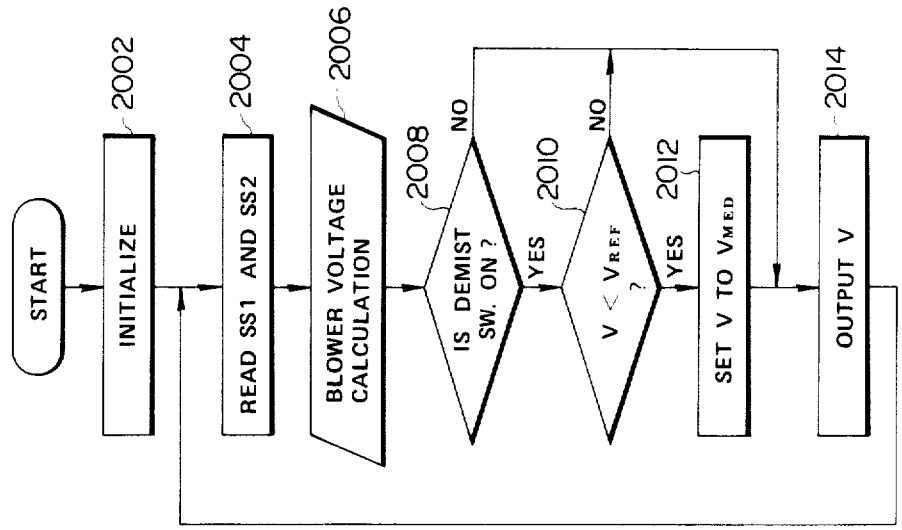
FIG. 7 is a flowchart of a blower speed control program.

FIG. 7 is a flowchart of a blower speed control program to perform the first embodiment of blower speed control according to the present invention.

In the blower speed control program of FIG. 7, the system is initialized in step 2002. Thereafter, the ambient air temperature sensor signal value and the room temperature sensor signal value are read in step 2004. Based on the read-out ambient air temperature sensor signal value and the room temperature sensor value, the blower speed is calculated at a block 2006 to derive the required blower motor voltage V. This blower speed calculation is discussed in detail in the aforementioned co-pending U.S. patent applications.

After deriving the blower motor voltage, the demister switch position is checked in step 2008. If the demister switch is OFF, a blower speed control signal having a value corresponding to the blower motor voltage derived in step 2006, is output to the blower motor control circuit 68. The blower motor control circuit 68 is responsive to the blower control signal to apply the controlled voltage to the blower motor 74 to control the blower speed.

After outputting the blower control signal in step 2014, control returns to the step 2004.

On the other hand, if the demist switch is ON when checked in step 2008, then the blower motor voltage V derived in step 2006 is compared with a predetermined threshold $V_{ref}$ in step 2010. If the blower motor voltage V is equal to or greater than the predetermined threshold $V_{ref}$, the process goes to the block 2014 to output the blower control signal with a value indicative of the blower motor voltage derived at the block 2006. On the other hand, if the blower motor voltage V is less than the predetermined threshold $V_{ref}$ when checked at the block 2012, the blower motor voltage V is modified to a given medium value $V_{med}$, at a block 2012. Then, the modified blower motor voltage is output at the block 2014.

As a result, the blower speed can be controlled to be not less than the given medium value $V_{med}$ while the demist switch is ON. Variation of the blower speed under the blower speed control as set forth will be seen in FIG. 6.

Figure 8:
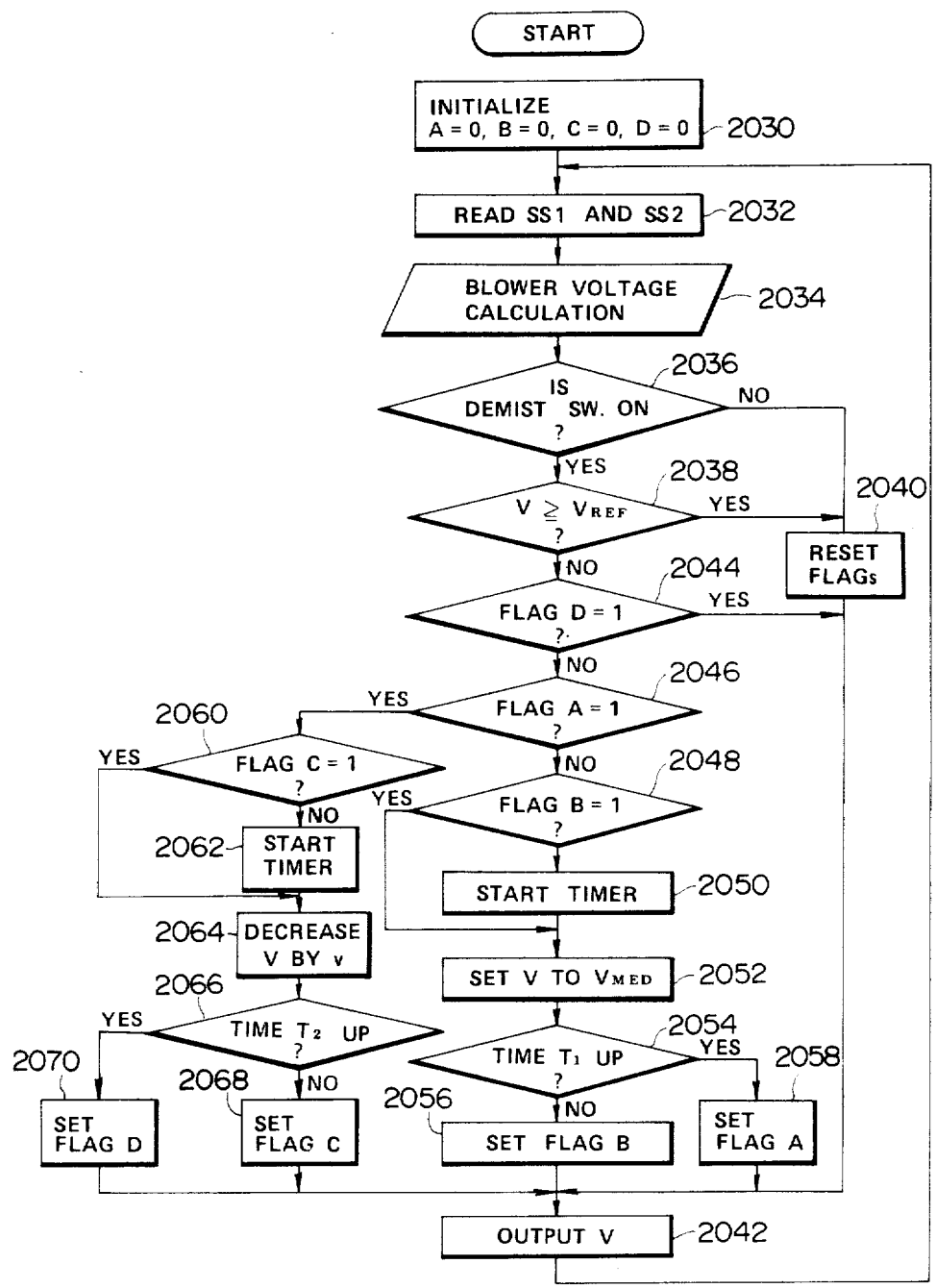
FIG. 8 is a flowchart of a modified blower speed control program.

FIG. 8 shows a modified blower speed control program, in which the blower speed is modified to the medium speed for a given period of time after turning ON the demist switch, if the blower speed is lower than the medium speed. This serves to temporarily increase the demisting effect after the demist switch is first turned on. Even after the given period of timer, the reduced blower speed will not allow the windshield to fog up again since the temperature and humidity of the air delivered through the defrosting vents are appropriately controlled. The modification shown in FIG. 8 however, will reduce the drain on the battery driving the blower motor and also limit blower noise in the vehicle compartment to satisfactorily low level.

The process mediate by the control program of FIG. 8 can be most easily understood by reference to FIG. 9. Up to time $t_1$ in FIG. 9, the demist switch has benn of and passenger compartment temperature has been brought to a desired temperature, so that the blower speed has been adjusted to the lowest level, corresponding to blower motor supply voltage $V_{min}$. However, ambient conditions are such that at time $t_1$ the windshield begins to fog over and by time $t_2$ the fogging has become severe enough to induce the driver to depress the demist switch.

When the demist switch is first turned on, the blower speed is adjusted to be not less than the level corresponding to supply voltage $V_{med}$. Thus, by time $t_3$ the blower motor is receiving voltage $V_{med}$ and this state is to be continued until the windshield is thoroughly defrosted. In practice, the blower voltage V is boosted, if necessary, for a fixed period of time $T_1$ following demist switch actuation at time $t_2$. Thus, by time $t_4 = t_2 + T_1$, the windshield has been cleared and thereafter, the blower speed need not be held at an artificially high level. However, rather than abruptly shutting the blower down, the blower voltage V is gradually decreased from $V_{med}$ to $V_{min}$ over the fixed period of time $T_2$ from time $t_4$ to time $t_5$. After time $t_5 = t_2 + T_1 + T_2$, the demist switch position has no effect on blower speed.

Immediately after starting execution, the system is initialized at a block 2030. At a block 2032, the ambient temperature sensor signal value SS1 and the room temperature sensor signal value SS2 are read out. Based on the ambient temperature signal value SS1 and the room temperature sensor signal value SS2, the blower speed is calculated to derive the voltage V to be supplied to the blower motor 74, at a block 2034. Thereafter, the demist switch position is checked at a block 2036.

If the demist switch remains in its OFF position when checked at the block 2034, then a first timer-ON flag B, a first time-up flag A, a second timer-ON flag C and a second time-up flag D are all reset at a block 2040 and a blower control signal indicative of the blower voltage derived at the block 2034 is output at a block 2042 to the blower motor control circuit 68. On the other hand, if the demist switch 63 is ON when checked at the block 2036, then the derived blower voltage V is compared with a voltage threshold $V_{ref}$, which in the preferred embodiment substantially corresponds to the medium blower voltage $V_{med}$, at a block 2038. If the blower voltage V is higher than the voltage threshold $V_{ref}$, then the flags A-D are all reset at the block 2040 and the blower control signal indicative of the blower voltage V derived at the block 2034 is output at the block 2042.

On the other hand, if the blower voltage V derived at the block 2034 is equal to or less than the voltage threshold $V_{ref}$, the second time-up flag D is checked at a block 2044. The second timer-up flag D is set only after both blower speed adjustment periods $T_1$ and $T_2$ have expired, i.e. after time $t_5$ in FIG. 9, and so indicates that the blower voltage V need not be adjusted. Therefore, if the second time-up flag D is set when checked in step 2044, control passes directly to step 2042 in which the unadjusted blower motor supply voltage V is output.

If the second time-up flag D is not set when checked at the block 2044, then the first time-up flag A is checked at a block 2046. The first timer flag A represents expiration of the period $T_1$, i.e. flag A is set at time $t_4$ of FIG. 9. If the first timer flag A is also not set when checked at the block 2046, the first timer ON flag B is checked at a block 2048, which flag B is set after a first time in the timer 214 of FIG. 5 is started in order to measure the period of time $T_1$ of FIG. 9. If the first timer ON flag B is not set, the first timer in the timer 214 of FIG. 5 is activated to start measurement of the first predetermined period $T_1$, at a block 2050. Thereafter, the blower voltage V derived at the block 2034 is modified to the intermediate level $V_{med}$ to drive the blower motor at its medium speed at a block 2052. The first timer value is then compared with a first timer threshold indicative of the first predetermined period $T_1$, at a block 2054. If the first timer value is less than the first timer threshold as checked at the block 2054, the first timer ON flag B is set at the block 2056. After expiration of the period $T_1$, control passes from step 2054 to a step 2058 in which the first time-up flag A is set. After either of the steps 2056 and 2058, control passes to the output step 2042.

After the first timer ON flag B is set at the block 2056, the answer at the block 2048 in subsequent program cycles will be YES. Therefore, in subsequent cycles of program execution, the routine jumps from the block 2048 to the block 2052 skipping the block 2050.

In the first and subsequent program cycles after flag A has been set in step 2058, the routine goes from step 2046 to a step 2060 in which the second timer-ON flag C is checked. The second timer-ON flag C is adapted to be set at the time $t_4$ when the second period $T_2$ starts to be clocked in the timer 214 of FIG. 5.

If the second timer-ON flag C is not set, then the second timer is activated to start measuring the second predetermined period $T_2$ of FIG. 9, at a block 2062. Thereafter, the blower voltage is modified at a block 2064 as to vary from the medium voltage to the voltage derived at the block 2034 within the second predetermined period of time $T_2$. Therefore, at the block 2064, the blower voltage is decremented by an amount v so that it gradually approaches the blower voltage V derived at the block 2034.

Expiration of the second predetermined period $T_2$ is then checked at a block 2066. If the second predetermined period $T_2$ has not expired, the second timer-ON flag C is set, at the block 2068. Once the second timer-ON flag C is set, the answer at the block 2060 becomes YES. Therefore, the block 2062 for starting the second timer is skipped in subsequent program execution cycles. When expiration of the second predetermined period $T_2$ is detected at the block 2066, then the second time-up flag D is set at the block 2070.

After the blocks 2056, 2058, 2068 and 2070, control passes to the block 2042 to output the derived or modified blower voltage V. In addition, after once setting the second timer-up flag D at the block 2070, the blower speed is controlled solely according to the value derived at the block 2034.

It should be appeciated that, in FIG. 9, the fixed rate of increase of the blower voltage over the period of time from $t_2$ to $t_3$ is selected with regard to the response characteristics of the blower motor and is provided to avoid excessive load on the blower motor as would occur abrupt changes in blower voltage were applied.

Figure 10:
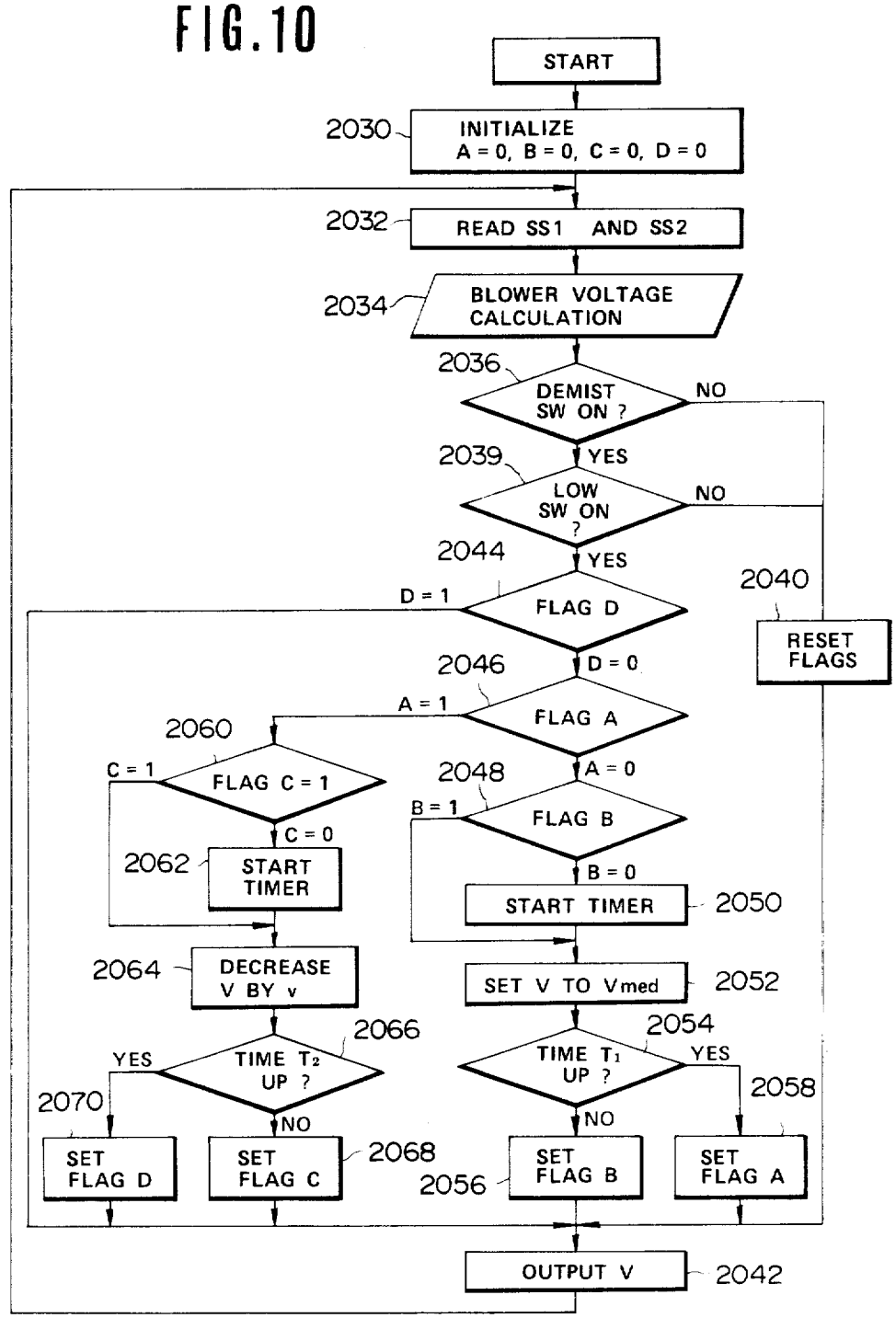
FIG. 10 is a flowchart of another modification of the blower speed control program.

FIG. 10 shows another modification of the preferred embodiment of the blower speed control system according to the present invention. In this modification, the blower speed adjustment in response to actuation of the demist switch may be performed only when the LOW mode has been selected. Therefore, the step 2038 of FIG. 8 in which the blower voltage V derived at the block 2034 in compared to a reference value $V_{ref}$ is replaced with a step 2039 in which the LOW mode switch is checked to see if it is turned ON. If the LOW mode switch when checked at the block 2039 is OFF, the normal procedure for controlling the blower speed is carried out by outputting the blower voltage derived at the block 2034.

On the other hand, if the LOW mode switch is ON, the blower voltage control routine is carried out starting from the block 2044.

It will be appreciated in this modified embodiment, the step 2039 is the only difference between the procedures shown in FIGS. 8 and 10. Therefore, explanation of other blocks will be omitted in order to avoid unnecessary repetition.

Figure 11:
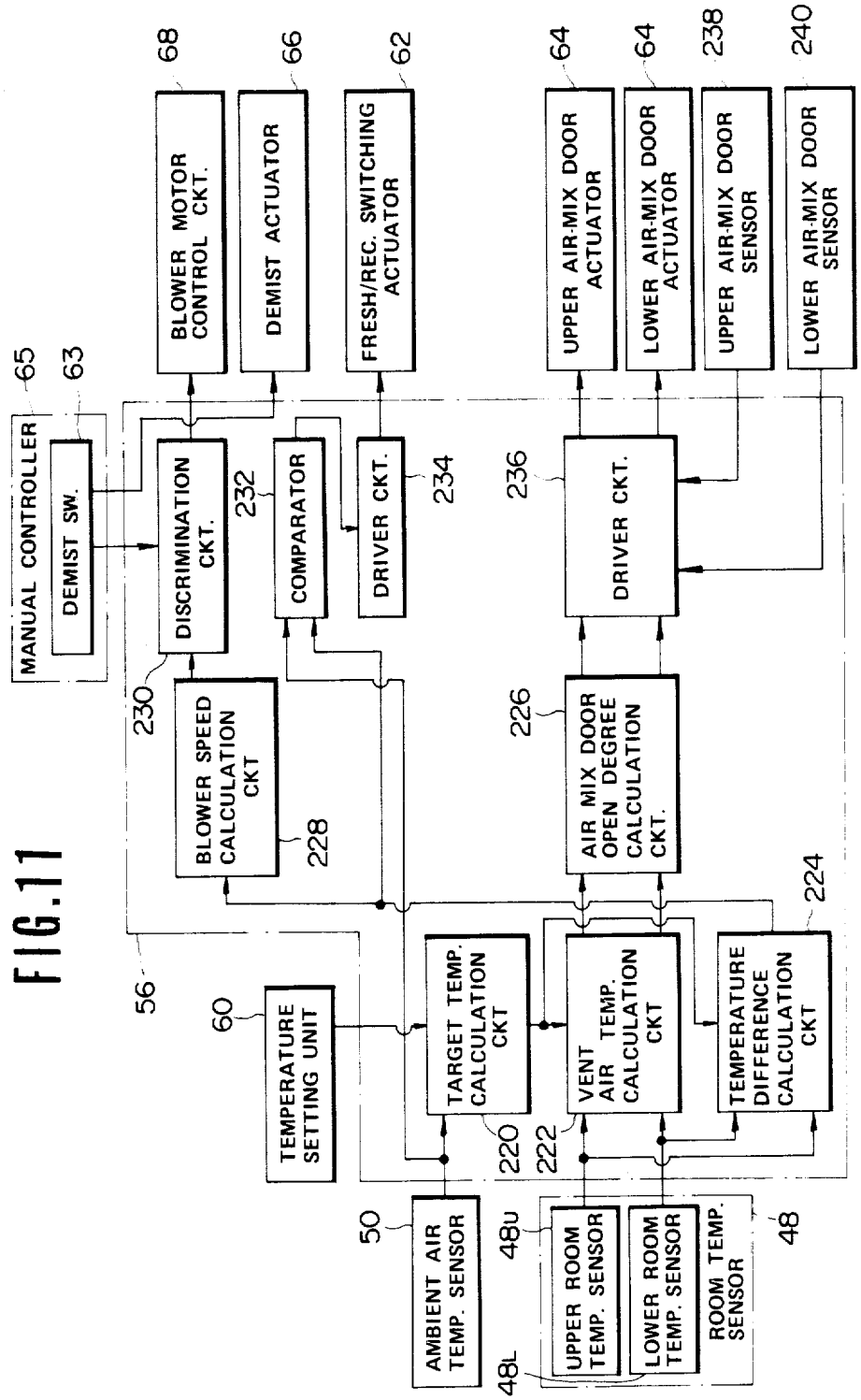
FIG. 11 is a block diagram of the second embodiment of the air conditioner control system according to the present invention.

FIG. 11 shows another embodiment of the automatic air conditioning system including a DEMIST mode in accordance with the present invention. A target temperature calculation circuit 220 is connected to the ambient air temperature sensor 50 and the temperature setting unit 60, which is manually operated to select the desired room temperature. The target temperature calculation circuit 220 receives an ambient air temperature-indicative signal from the ambient air temperature sensor and a set temperature-indicative signal from the temperature setting unit 60. Based on the ambient air temperature-indicative signal and the set temperature-indicative signal, the target temperature calculation circuit derives a target temperature and produces a target temperature indicative signal. The target temperature-indicative signal is fed to a vent air temperature calculation circuit 222.

As stated previously, the air conditioning system controlled by the controller 56 has upper and lower vent air mix chambers, the air temperatures of which are controlled independently. Therefore, the vent air temperature calculation circuit 222 is connected to an upper room air temperature sensor 48U and a lower room air temperature sensor 48L which together comprise the room air temperature sensor 48.

The vent air temperature calculation circuit 222 derives target temperatures of for the air to be discharged through each of the upper vent and the floor vent independently based on the upper section room temperature-indicative signal from the upper room temperature sensor 48U and the lower section room temperature-indicative signal from the lower room temperature sensor 48L. The vent air temperature calculation circuit 222 sends the independently derived upper and lower vent air target temperature-indicative signals to an air mix door open-degree calculation circuit 226. The air mix door open-degree calculation circuit 226 calculates the required positions of the air mix door 82 and the lower air control doors 84 and 86 and produces air mix door control signals for controlling the air mix door and the lower air control doors. The air mix door control signals are sent to a driver circuit 236 associated with the upper and lower air mix door actuator 64 which moves the air mix door and the lower air control doors to the determined positions. The driver circuit 236 is connected to upper and lower air mix door sensors 238 and 240 which are respectively adapted to produce open-degree-indicative feedback signals. Based on the air mix door control signals and the open-degree-indicative feedback signals, the driver circuit 236 produces driver signals for moving the air mix door 82 and the lower air control doors 84 and 86 to the open degree corresponding to the positions derived by the air mix door open-degree calculation circuit 226.

On the other hand, the target room temperature calculation circuit 220 is connected for output to a temperature difference calculation circuit 224. The upper and lower room temperature sensors 48U and 48L are also connected to the temperature difference calculation circuit 224. The temperature difference calculation circuit derives an average room temperature based on the upper and lower room temperature-indicative signals from the upper and lower room temperature sensors 48U and 48L. The temperature difference calculation circuit 224 also derives the temperature difference between the target temperature indicated by the target temperature-indicative signal from the target temperature calculation circuit 220 and the average room temperature and produces a temperature difference-indicative signal.

A blower speed calculation circuit 228 is connected to the temperature difference calculation circuit 224 to receive the temperature difference-indicative signal. Based on the temperature difference-indicative signal, the blower speed calculation circuit derives the blower voltage to be supplied to the blower motor. A blower motor voltage-indicative signal is sent by the blower speed calculation circuit 228 to a blower motor control circuit 68 via a discrimination circuit 230. The discrimination circuit 230 is connected to the demister switch 63 in the manual controller console 65.

The discrimination circuit 230 responds to actuation of the demister switch by modifying the blower voltage derived by the blower speed control circuit 228. When the demist switch is ON, the blower voltage derived by the blower speed calculation circuit 228 is compared with a reference value which corresponds to the medium blower speed in the embodiment above. If the derived blower voltage is equal to or higher than the reference value, then the blower voltage-indicative signal is transmitted directly to the blower motor control circuit as derived by the blower speed calculation circuit. On the other hand, if the blower voltage is lower than the reference value, the blower voltage-indicative signal value is modified to indicate the medium voltage.

A comparator 232 receives the ambient air temperature-indicative signal and the temperature difference-indicative signal and sends a fresh/recirculation signal indicative of their difference to a driver circuit 234, which in turn controls the fresh/recirculation door actuator 62. Generally speaking, when the difference is relatively large, the actuator 62 will move the door 70 to the recirculation position until the difference decreases.

Figure 12:
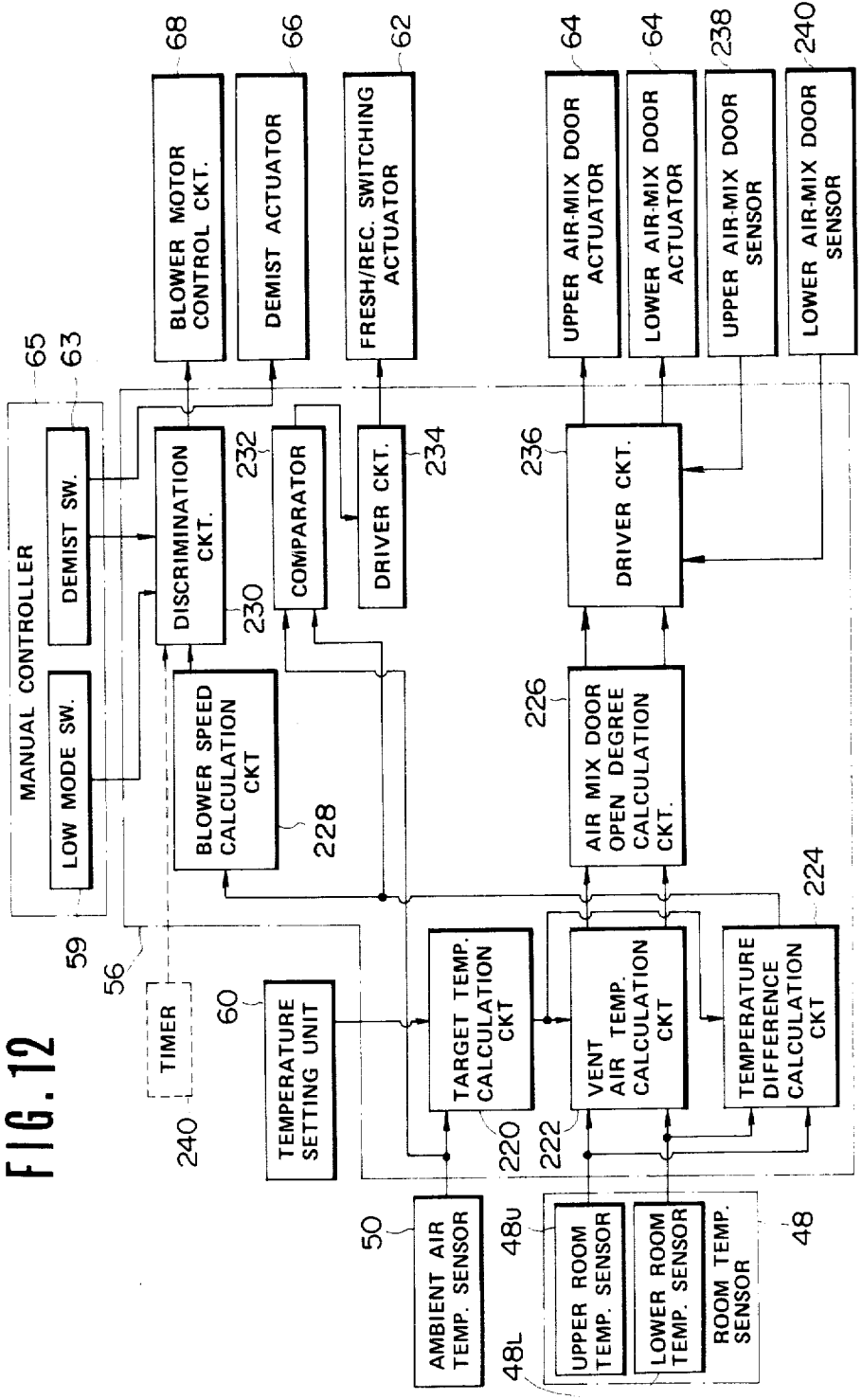
FIG. 12 is a block diagram of a modification of the second embodiment of air conditioner control system.

FIG. 12 is a modification of the second embodiment. In this modification, the discrimination circuit 230 is also connected to a LOW mode switch 59. When the LOW mode switch 59 is turned ON, the blower voltage derived by the blower speed calculation circuit 228 is modified to a minimum voltage so as to drive the blower motor at the minium speed. If the DEMIST switch is depressed while the LOW mode switch 59 is ON, the blower voltage is set at the medium voltage.

As shown in phantom lines in FIG. 12, the discrimination circuit 230 may also be connected to a timer 240 which is adapted to measure the period of time for which the blower voltage is set to the medium voltage. The discriminator may decrease the blower voltage from the medium voltage to the minimum voltage at a given rate after expiration of a predetermined period of time.

As set forth above, the present invention is effective in response to turning ON of the DEMIST switch to clear up the front windshield by temporarily increasing blower voltage to a medium value. In addition, by providing the DEMIST mode operation for the air conditioning system, defogging operation can be carried out while, at the same time, performing air conditioning of the vehicle cabin.

Therefore, the invention fulfills all of the objects and advantages sought therefor.

What is claimed is:

1. A blower speed control system for an automotive air conditioning system comprising:
   an air induction system including a variable-speed, motor-driven blower;
   an evaporator and a heater core, first and second cooling air passages, first and second heating air passages, said evaporator feeding a cooling air through said first and second cooling air passages, and said heater core incorporating means for introducing a controlled amount of cooling air flowing in at least one of said first and second cooling air passages into said heater core and for feeding heating air through said first and second heating air passages;
   a plurality of air outlets for conducting conditioned air into a vehicle cabin, said outlets including a defrosting outlet directed toward a front windshield, an upper vent air outlet and a lower vent air outlet;
   first and second air mix chambers connected to said first and second cooling air passages and said first and second heating air passages for mixing cooling and heating air from said evaporator and said heater core, said first air mix chamber receiving cooling air flowing through said first cooling air passage and heating air flowing through said first heating air passage for adjusting temperature of said conditioned air to be discharged through at least one of said defroster and said upper vent outlets, and said second air mix chamber receiving cooling air flowing through said second cooling air passage and heating air flowing through said second heating air passage for adjusting temperature of said conditioned air to be discharged through said lower vent outlet;

means for setting first and second temperatures for controlling said introduction means for adjusting said controlled amount of cooling air to be introduced into said heater core and adjusting a proportion of heating air to be distributed into said first and second heating air passages according to said first and second temperatures;

a plurality of shutter means each of which is associated with a corresponding air outlet for opening and closing the corresponding outlet depending upon a selected operational mode of the air conditioning system; and a mode selector associated with said shutter means for selecting a specific combination of outlets to be opened depending upon the selected operational mode of the air conditioning system, said mode selector allowing selection of a DEMIST mode in which said upper vent air outlet is closed and said defrosting outlet and said lower vent air outlet are open in order to discharge air from both said defrosting outlet and said lower vent air outlet with the temperatures of said conditioning air being adjusted in said first and second air mix chambers according to said first and second temperatures; and a blower speed control means for controlling the speed of said motor-driven blower for adjusting air flow through the air induction system, said blower speed control means controlling the blower speed within a predetermined speed range defined by predetermined maximum and minimum speeds and including a predetermined medium speed, and said blower speed control means being responsive to selection of said DEMIST mode for modifying the speed range of said blower only if said blower speed is below said medium speed by adjusting the blower speed to said medium speed.

2. The air conditioning system as set forth in claim 1, wherein said blower speed control means includes a timer means responsive to selection of said DEMIST mode to measure a predetermined period of time and terminate said modification of the blower speed range after said predetermined period of time has expired.

3. The air conditioning system as set forth in claim 2, wherein said timer means is adapted to meausure a first predetermined period within which said blower speed is to be maintained above said predetermined medium speed and to measure a second predetermined period during which said variation range of said blower speed is gradually expanded to said predetermined speed range defined by said maximum and minimum speeds.

4. The air conditioning system as set forth in claim 3, wherein said mode selector allows selection of a LOW speed mode in which said blower is driven at said minimum speed, and allowing selection of said DEMIST mode while said LOW speed mode is selected for modifying the speed range of said blower to maintain the blower speed at least as high as said medium speed.

5. The air conditioning system as set forth in claim 1, wherein said first and second air mix chambers, operate in said DEMIST mode for separately adjusting the temperature of air discharged from said defrosting outlet and are discharged from said lower vent air outlet.

6. The air conditioning system as set forth in claim 5, wherein further including a pressure responsive door for passing high pressure heated air from one of said first and second air mixing chambers to the other of said first and second air mixing chambers.

7. An automotive air conditioning system comprising:

an air induction system including a variable speed, motor-driven blower, an evaporator and a heater core, first and second cooling air passages, first and second heating air passages, said evaporator feeding a cooling air through said first and second cooling air passages, and said heater core incorporating means for introducing a controlled amount of cooling air flowing in at least one of said first and second cooling air passages into said heater core and for feeding heating air through said first and second heating air passages;

a plurality of air outlets for conducting conditioned air into a vehicle cabin, said outlets including a defrosting outlet directed toward a front windshield, an upper vent air outlet and a lower vent air outlet;

first and second air mix chambers connected to said first and second cooling air passages and said first and second heating air passages for mixing cooling and heating air from said evaporator and said heater core, said first air mix chamber receiving cooling air flowing through said first cooling air passage and heating air flowing through said first heating air passage for adjusting temperature of said conditioned air to be discharged through at least one of said defroster and said upper vent outlets, and said second air mix chamber receiving cooling air flowing through said second cooling air passage and heating air flowing through said second heating air passage for adjusting temperature of said conditioned air to be discharged through said lower vent outlet;

means for setting first and second temperatures for controlling said introduction means for adjusting said controlled amount of cooling air to be introduced into said heater core and adjusting a proportion of heating air to be distributed into said first and second heating air passages according to said first and second temperatures;

a plurality of shutter means, each of which is associated with a corresponding air outlet for opening and closing the corresponding outlet depending upon a selected operational mode of the air conditioning system;

a mode selector associated with said shutter means for selecting a specific combination of outlets to be opened depending upon the selected operational mode of the air conditioning system, said mode selector allowing selection of a DEMIST mode in which said upper vent air outlet is closed and said defrosting and said lower vent air outlets are open in order to discharge air from both said defrosting outlet and said lower vent air outlet with the temperatures of said conditioning air being adjusted in said first and second air mix chambers according to said first and second temperatures; and a blower speed control means for controlling the speed of said motor-driven blower for adjusting air flow through the air induction system, said blower speed control means controlling the blower speed within a predetermined speed range defined by predetermined maximum and minimum speeds and including a predetermined medium speed, and said blower speed control means comparing the blower speed with a given value which is set smaller than or equal to said medium speed, and said blower speed control means being responsive to selection of said DEMIST mode for modifying the speed range of said blower by adjusting the blower speed to said medium speed when said blower speed is lower than said given value as indicated by said blower speed control comparing the blower speed with the given value.

8. The air conditioning system as set forth in claim 7, wherein said first and second air mix chambers operate in said DEMIST mode for separately adjusting the temperature of air discharged from said defrosting outlet and air discharged from said lower vent air outlet.

9. The air conditioning system as set forth in claim 8, further including a pressure responsive door for passing high pressure heated air from one of said first and second air mixing chambers to the other of said first and second air mixing chambers.

10. The air conditioning system as set forth in claim 7, wherein said blower speed control means includes a timer means responsive to selection of said DEMIST mode to measure a predetermined period of time and terminate said modification of the blower speed range after said predetermined period of time has expired.

11. The air conditioning system as set forth in claim 7, wherein said mode selector allows selection of a LOW speed mode in which said blower is driven at said minimum speed, and allows selection of said DEMIST mode while said LOW speed mode is selected for modifying the speed range of said blower to maintain said blower speed at least as high as said medium speed.

* * * * *